US011993453B2

(12) United States Patent
Blackmon et al.

(10) Patent No.: US 11,993,453 B2
(45) Date of Patent: May 28, 2024

(54) ROLLER JACK FOR ISO-TYPE CONTAINERS

(71) Applicant: United States of America as Represented by The Secretary of The Army, Alexandria, VA (US)

(72) Inventors: Mickey D Blackmon, Vicksburg, MS (US); David M Rogillio, Vicksburg, MS (US); Christopher M Ables, Vicksburg, MS (US); Timothy P Hynum, Vicksburg, MS (US); Jeremy N Sellers, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 916 days.

(21) Appl. No.: 17/033,314

(22) Filed: Sep. 25, 2020

(65) Prior Publication Data

US 2022/0097956 A1 Mar. 31, 2022

(51) Int. Cl.

*B65D 90/18* (2006.01)
*B66F 5/02* (2006.01)
*B66F 9/18* (2006.01)

(52) U.S. Cl.

CPC ................ *B65D 90/18* (2013.01); *B66F 5/02* (2013.01); *B66F 9/18* (2013.01)

(58) Field of Classification Search

CPC ... B66F 5/02; B66F 3/46; B65D 90/18; B60P 3/40

See application file for complete search history.

(56) References Cited

U.S. PATENT DOCUMENTS

| | | | | | |
|---|---|---|---|---|---|
| 3,834,111 | A * | 9/1974 | Acker | B60P 3/40 | 52/143 |
| 3,887,209 | A * | 6/1975 | Blanc | B65D 90/14 | 280/43.23 |
| 4,231,709 | A * | 11/1980 | Corsetti | B60P 1/6445 | 280/43.23 |
| 4,452,555 | A * | 6/1984 | Calabro | B65D 90/18 | 280/43.23 |
| 4,516,901 | A * | 5/1985 | Riedl | B65D 90/143 | 414/458 |
| 5,800,114 | A * | 9/1998 | Secondi | B66F 3/46 | 410/82 |

(Continued)

*Primary Examiner* — Seahee Hong
(74) *Attorney, Agent, or Firm* — Brian C. Jones

(57) ABSTRACT

In one embodiment, a roller jack includes: caster wheel attached to jack lift attached to an angle member having an angle member opening, and a locking mechanism to releasably lock the angle member to a corner block of a container through an elongated opening of the corner block. The locking mechanism includes: a locking mechanism baseplate having a baseplate protrusion, a swivel locking plate to be inserted through the angle member opening and the elongated opening of the corner block to the interior of the corner block, and a locking bolt for moving the swivel locking plate to an engaged position, where the swivel locking plate is prevented from passing through the angle member opening and the elongated opening of the corner block, and for threadingly moving the swivel locking plate toward the locking mechanism baseplate to press the angle member and the external wall of the corner block together.

20 Claims, 10 Drawing Sheets

(56) References Cited

U.S. PATENT DOCUMENTS

| | | | | |
|---|---|---|---|---|
| 7,100,896 | B1 * | 9/2006 | Cox | B66F 3/46<br>414/458 |
| 2012/0298935 | A1 * | 11/2012 | Ross | B60P 3/40<br>254/2 R |

* cited by examiner

ROLLER JACK FOR ISO-TYPE CONTAINERS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to lifting a container from the ground and moving the container and, more particularly, to roller jacks for moving ISO-type containers.

Description of the Related Art

This section introduces aspects that may help facilitate a better understanding of the invention. Accordingly, the statements of this section are to be read in this light and are not to be understood as admissions about what is prior art or what is not prior art.

Prefabricated containers such as ISO-type containers are used for many purposes including relocation and storage and can be modified to be used as tiny homes and, more recently, medical isolation rooms. Forklifts or other similarly large and complex equipment are often used to move these containers, but they typically require about 12' of width and 15' of headroom. Final positioning of the containers, especially in close quarters and tight spaces, presents a challenge.

SUMMARY

Embodiments of the invention are directed to a compact roller jack that can be easily attached to a corner block of an ISO-type container. Four roller jacks attached to four lower corner blocks of the container can lift and move the container. Each roller jack includes a jack lift attached to a caster wheel at the bottom and attached to a jack stand assembly having an angle member that is to be attached to an outer corner edge of the container. The angle member has an elongated (e.g., oval or elliptical) opening that matches the elongated opening of the corner block. A locking mechanism attaches the angle member via the elongated openings to the corner block and locks the angle member to the corner block by pressing them together to form a secure connection. The result is a robust, versatile, and adaptable roller jack that is simple and sturdy in construction, is easy to use, and operates effectively in close quarters.

In the locked position generated by the locking mechanism, the angle member of the jack stand assembly is wrapped around an outer corner edge of the container above the lower corner block while the locking mechanism presses the angle member and the lower corner block tightly together. These two features create a more secure and stable connection between the roller jack and the container, which is not necessary for a stationary jack but provides an important advantage of secure and stable operation for a roller jack.

The roller jack requires no tools to operate. It can be locked, twisted, secured, and jacked/raised. When four roller jacks are in place at the four corners, respectively, they provide easy movement of the ISO-type unit by a few individuals and with no motorized equipment. It can be adapted to deal with uneven surfaces, for example, an out of level situation at a door entry, to bring an ISO-type container indoors from the drop off point where the delivery truck or vendor-provided apparatus can go no further. Further, in the instance of the particular application of the container medical solutions units which are for medical applications under clean conditions, there are no forklift fumes, grease or oil, or the like.

In accordance with an aspect of the present invention, a roller jack apparatus comprising: a caster wheel; a jack lift attached to the caster wheel, the jack lift having a vertical lift between a minimum height position and a maximum height position; a jack stand having an angle member which is attached to the jack lift to be moved vertically by the jack lift and includes an angle member opening which is elongated; and a locking mechanism to releasably lock the angle member to a corner block of a container through an elongated opening of an external wall of the corner block. The locking mechanism includes: a locking mechanism baseplate which is larger than the angle member opening to prevent the locking mechanism baseplate from passing through the angle member opening to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block; a swivel locking plate which is smaller than the elongated opening of the corner block to allow the swivel locking plate to pass through the angle member opening and the elongated opening of the corner block to the interior of the corner block; a locking bolt coupled with the locking mechanism baseplate and threadingly connected to the swivel locking plate to rotate the swivel locking plate relative to the locking mechanism baseplate and the corner block around a rotational axis when the swivel locking plate is not rotationally constrained, and to threadingly move the swivel locking plate along the rotational axis, when the swivel locking plate is rotationally constrained, toward the locking mechanism baseplate by rotating the locking bolt in one direction and away from the locking mechanism baseplate by rotating the locking bolt in another direction, the swivel locking plate having a major length which is a maximum length of the swivel locking plate through the rotational axis and larger than a minor length which is a minimum length of the swivel locking plate through the rotational axis, the major length of the swivel locking plate being smaller than a major length of the elongated opening of the corner block which is a maximum length of the elongated opening through the rotational axis and being larger than a minor length of the elongated opening of the corner block which is a minimum length of the elongated opening through the rotational axis; and a rotational constraint attached to the locking mechanism baseplate to rotationally constrain the swivel locking plate within a rotational range of about 45° to about 135°.

In some embodiments, the elongated opening of the corner block is oval. The swivel locking plate is oval. The angle member opening matches in vertical dimension to the elongated opening of the corner block. The elongated protrusion has a thickness not greater than a combined thickness of the angle member and the external wall of the corner block having the elongated opening. The angle member is wrapped around an outer corner edge of the container above the corner block when the locking mechanism locks the angle member to the corner block through the elongated opening of the corner block.

In specific embodiments, the rotational constraint comprises a stopper bolt attached to the locking mechanism baseplate. The swivel locking plate includes a curved slot along which the stopper bolt slide when the swivel locking plate is rotated relative to the locking mechanism baseplate by rotating the locking bolt. The curved slot is a circular slot centered around the rotational axis and having a rotational range of 90°. The stopper bolt has a secondary function of keeping the swivel locking plate from falling off into the interior of the container or the container corner block. Alternatively or additionally, the locking bolt is configured to keep the swivel locking plate from falling off into the interior of the container or the container corner block.

In accordance with another aspect of the present invention, a roller jack apparatus comprises: a caster wheel; a jack lift attached to the caster wheel, the jack lift having a vertical lift between a minimum height position and a maximum height position; a jack stand having an angle member which is attached to the jack lift to be moved vertically by the jack lift and includes an angle member opening which is elongated; and a locking mechanism to releasably lock the angle member to a corner block of a container through an elongated opening of an external wall of the corner block. The locking mechanism includes: a locking mechanism baseplate which is larger than the angle member opening to prevent the locking mechanism baseplate from passing through the angle member opening to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block; a swivel locking plate which is smaller than the elongated opening of the corner block to allow the swivel locking plate to pass through the angle member opening and the elongated opening of the corner block to the interior of the corner block; a mechanism for moving the swivel locking plate between a disengaged position, where the swivel locking plate is allowed to pass through the angle member opening and the elongated opening of the corner block along a locking mechanism axis, and an engaged position, where the swivel locking plate is prevented from passing through the angle member opening and the elongated opening of the corner block along the locking mechanism axis; and a mechanism for locking the angle member to the corner block in the engaged position by moving the swivel locking plate from the engaged position toward the locking mechanism baseplate along the locking mechanism axis to press the angle member and the external wall of the corner block having the elongated opening together between the locking mechanism baseplate and the swivel locking plate in a locked position.

In some embodiments, the mechanism for locking the angle member to the corner block in the engaged position includes a mechanism for unlocking the angle member from the corner block by moving the swivel locking plate from the locked position away from the locking mechanism baseplate along the locking mechanism axis to the engaged position. The angle member is wrapped around an outer corner edge of the container above the corner block when the means for locking locks the angle member to the corner block through the elongated opening of the corner block.

In specific embodiments, the elongated opening of the corner block is oval and the swivel locking plate is oval. The elongated opening of the corner block is oval. The angle member opening matches in vertical dimension to the elongated opening of the corner block. The elongated protrusion has a thickness not greater than a combined thickness of the angle member and the external wall of the corner block having the elongated opening.

Another aspect of the invention is directed to a method of lifting a container at a lower corner there using a roller jack apparatus which includes a caster wheel, a jack lift attached to the caster wheel and having a vertical lift between a minimum height position and a maximum height position, a jack stand having an angle member which is attached to the jack lift to be moved vertically by the jack lift and includes an angle member opening which is elongated, and a locking mechanism to releasably lock the angle member to a corner block of a container through an elongated opening of an external wall of the corner block. The locking mechanism includes: a locking mechanism baseplate and a swivel locking plate; the locking mechanism baseplate being larger than the angle member opening to prevent the locking mechanism baseplate from passing through the angle member opening along a locking mechanism axis to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block; the swivel locking plate being smaller than the elongated opening of the corner block to allow the swivel locking plate to pass through the angle member opening and the elongated opening of the corner block to the interior of the corner block. The method includes: placing the angle member opening of the angle member next to the elongated opening of the corner block of the container, in alignment with one another along the locking mechanism axis; inserting the elongated swivel locking plate through the angle member opening and the elongated opening of the corner block into the interior of the corner block in a disengaged position; inserting the elongated protrusion of the locking mechanism baseplate through the angle member opening and into but not through the elongated opening of the corner block; moving the swivel locking plate inside the interior of the corner block from the disengaged position, where the swivel locking plate is allowed to pass through the angle member opening and the elongated opening of the corner block along the locking mechanism axis, to an engaged position, where the swivel locking plate is prevented from passing through the angle member opening and the elongated opening of the corner block along the locking mechanism axis; locking the angle member to the corner block in the engaged position by moving the swivel locking plate from the engaged position toward the locking mechanism baseplate in the locking mechanism direction to press the angle member and the external wall of the corner block having the elongated opening together between the locking mechanism baseplate and the swivel locking plate in a locked position; and moving the jack lift upward to lift the angle member attached to the jack lift and the corner block engaged and locked to the angle member.

In some embodiment, the method further comprises wrapping the angle member around an outer corner edge of the container above the corner block when the angle member is locked to the corner block through the elongated opening of the corner block. The method further includes unlocking the angle member from the corner block by moving the swivel locking plate from the locked position away from the locking mechanism baseplate in the locking mechanism direction to the engaged position.

In specific embodiments, moving the swivel locking plate inside the interior of the corner block from the disengaged position to the engaged position comprises rotating the locking bolt to rotate the swivel locking plate from the disengaged position to the engaged position when the swivel locking plate rotates with the stopper bolt sliding along the curved slot of the swivel locking plate without being rotationally constrained.

In some embodiments, locking the angle member to the corner block in the engaged position comprises rotating the locking bolt when the stopper bolt is stopped against an end of the curved slot of the swivel locking plate to rotationally constrain the swivel locking plate, thereby moving the swivel locking plate from the engaged position toward the locking mechanism baseplate in the locking mechanism direction to press the angle member and the external wall of the corner block having the elongated opening together between the locking mechanism baseplate and the swivel locking plate in the locked position.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms “a,” “an,” and “the,” are intended to include the plural forms as well, unless the context clearly indicates otherwise. It further will be understood that the terms “comprises,” “comprising,” “includes,” and/or “including,” specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
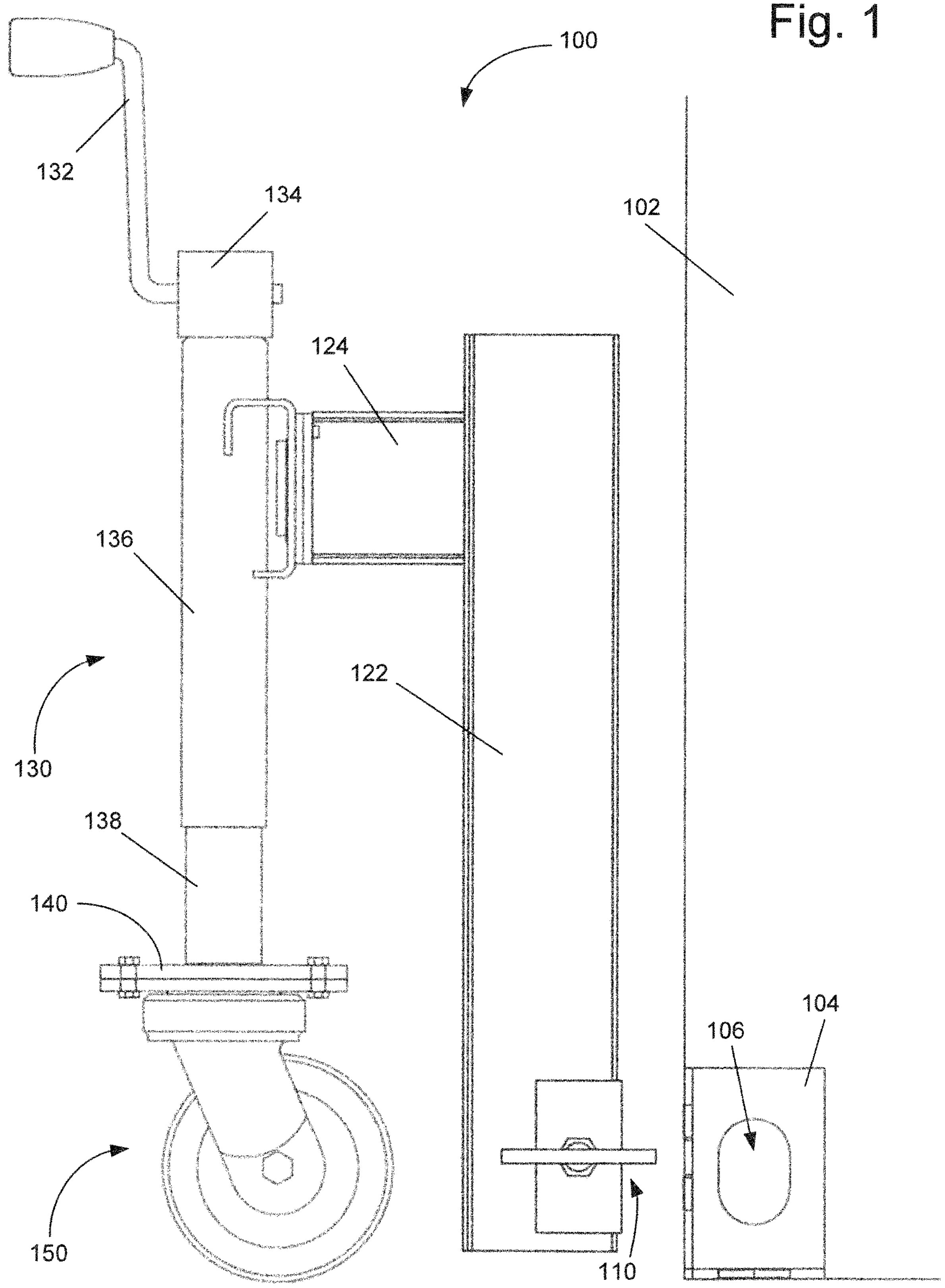
FIG. 1 is a perspective view of a roller jack and a container prior to attaching and locking the roller jack to a corner block of the container according to an embodiment of the present invention.

FIG. 1 is a perspective view of a roller jack 100 and a container 102 prior to attaching and locking the roller jack to a corner block of the container according to an embodiment of the present invention. The container 102 includes a plurality of corner blocks, one of which is shown in FIG. 1. The corner block 104 has an elongated opening 106 through which the roller jack 100 can be engaged and locked to the corner block 104 by a locking mechanism 110. In an example, the locking mechanism 110 attaches an angle member or angle iron 122 of a jack stand assembly 120 of the roller jack 100 to the corner block 104. The angle member 122 of the jack stand assembly 120 is attached via a connecting member 124 to a jack lift 130, which includes a crank arm 132, a gear box 134, and an outer tube 136 and an inner tube 138 in a telescoping configuration along a generally vertical direction. The inner tube 138 is slidable relative to the outer tube 136 in a telescoping manner between an unextended position (jack lift 130 at a minimum height) and an extended position (jack lift 130 at a maximum height). FIG. 1 shows the tubes in or near the unextended telescoping position. The inner tube 138 is attached at the bottom via an attachment plate 140 to a caster wheel 150. In the embodiment shown, the inner tube 138 is welded to the attachment plate 140 which is bolted to the caster wheel 150.

Figure 2:
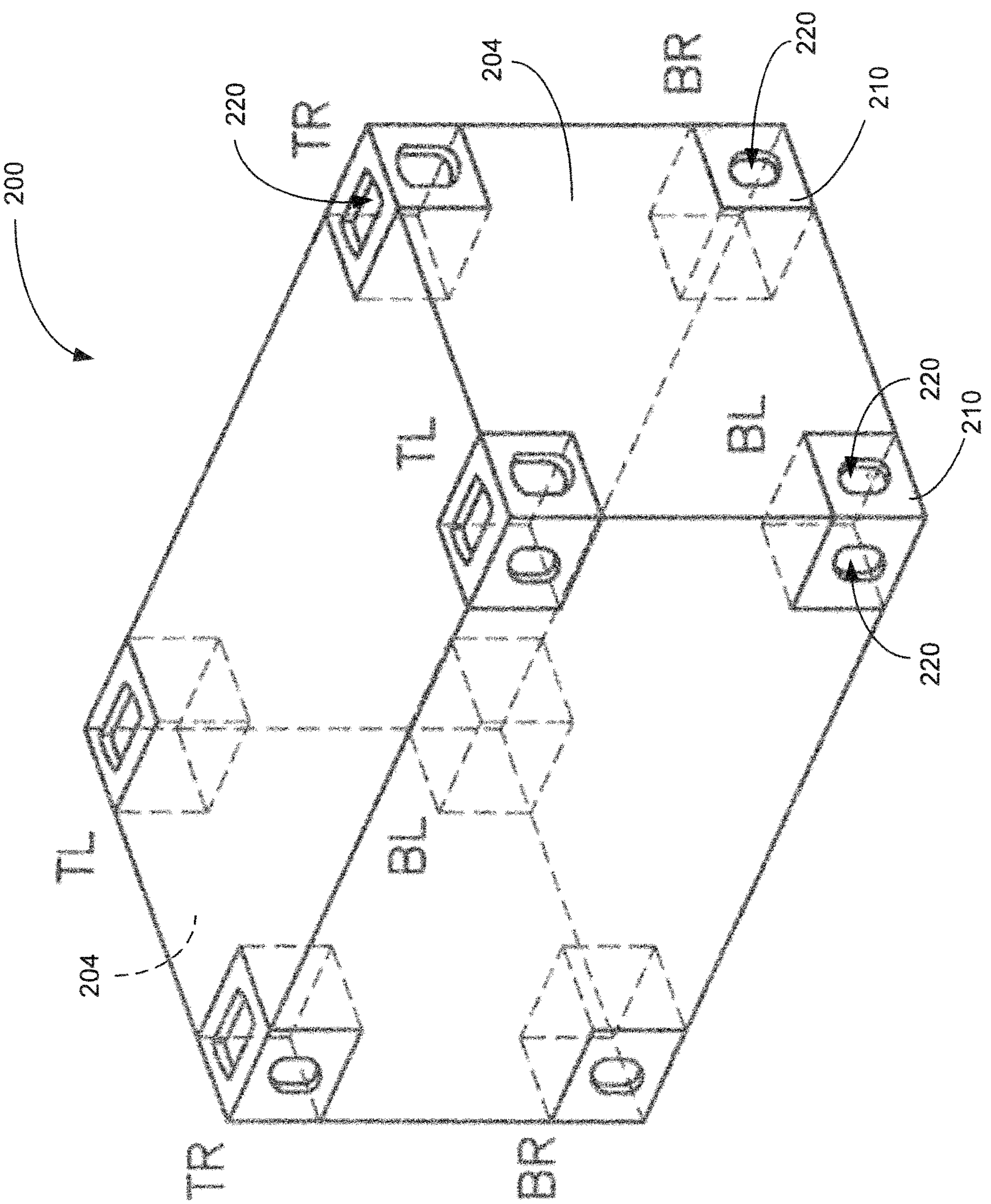
FIG. 2 is a perspective view of an ISO-type container having a plurality of corner blocks.

FIG. 2 is a perspective view of an ISO-type container having a plurality of corner blocks. The container 200 may be an intermodal container, also known as a cargo or freight container, ISO container, or shipping, sea, or ocean container. One example of a suitable container 100 is a QuadCon, which is a unique and versatile mini-container originally developed for use by the United States Armed Forces. Another example is a prefabricated container commercially available from PODS or the like. The container 200 includes a floor or base structure assembly, a top panel or roof, two side walls, and two end walls 204. These structural components are typically made of weathering steel or Corten steel. In some embodiments, the prefabricated container has a width of about 8 feet, a height of about 8 feet, and a length of about 12-16 feet It has eight container corner fittings or blocks 210, four for each of the two end walls 204, including top left (TL), top right (TR), bottom left (BL), and bottom right (BR). Each corner block 210 has up to three elongated openings 220 into a hollow interior. The corner block 210 may be an off-the-shelf ISO 1161 steel casting that meets ISO 1161 standard for shipping container corner geometry.

Figure 3:
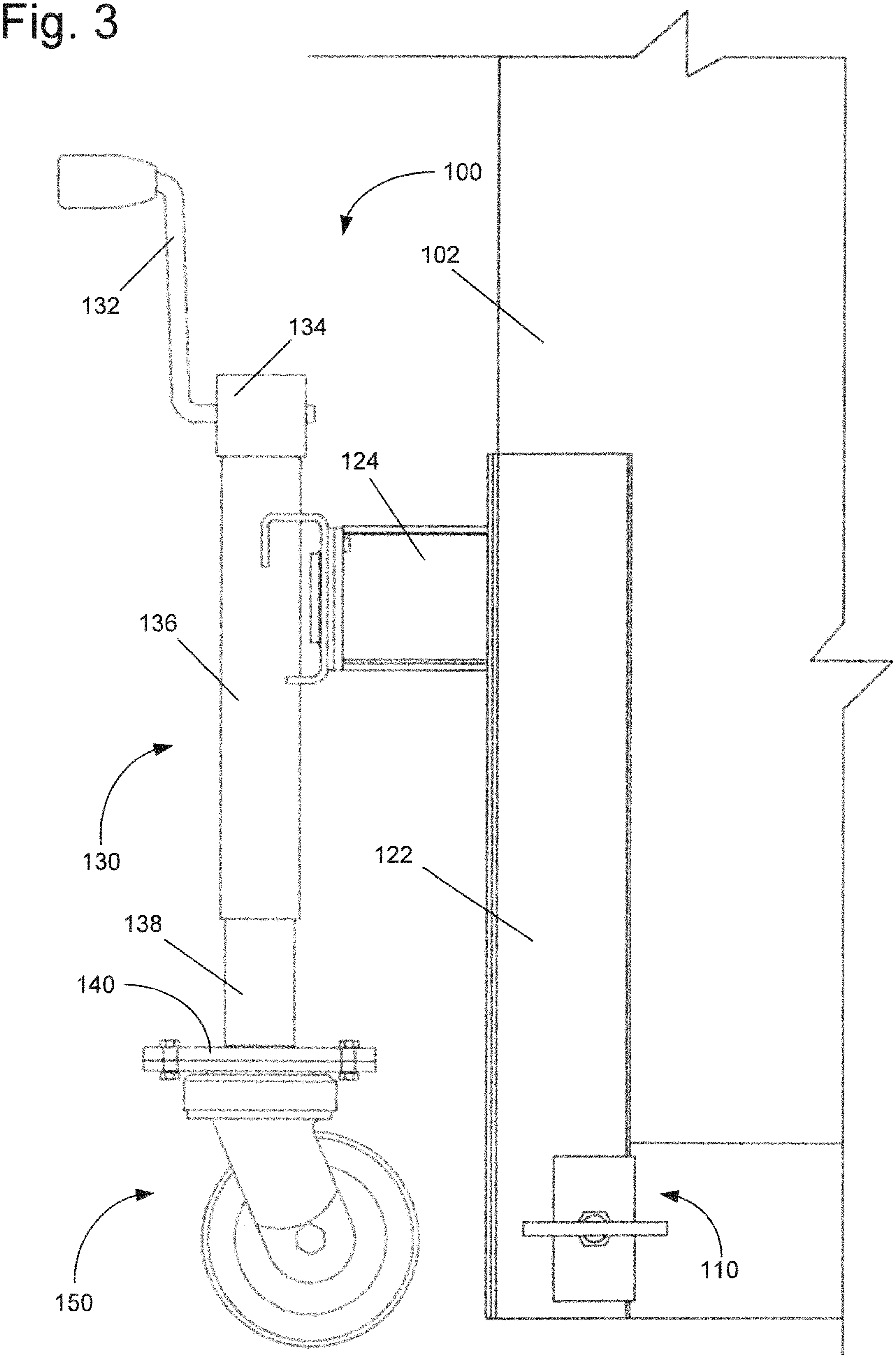
FIG. 3 is a perspective view of the roller jack of FIG. 1 which is engaged and locked to the corner block of the container.

FIG. 3 is a perspective view of the roller jack of FIG. 1 which is engaged and locked to the corner block of the container. The locking mechanism 110 attaches the angle member 122 of the jack stand assembly 120 of the roller jack 100 to the corner block 104 through the elongated opening 106 of FIG. 1. The angle member 122 is wrapped around an outer corner edge of the container 102 above the corner block 104 when the locking mechanism 110 locks the angle member 122 to the corner block through the elongated opening of the corner block. In specific embodiments, the angle member 122 is wrapped around the outer corner edge of the container 102 from the corner block 104 at the bottom to a location that is typically about one foot or longer from the bottom (e.g., a 2 feet angle member 122 wrapped around the outer corner edge at about 1 foot from the bottom to about 3 feet from the bottom of the container) and the lift range is typically about 3-15 inches. The inner tube 138 of the jack lift 130 is at the unextended position and the jack lift 130 is at the minimum height. With these dimensions, the crank arm 132 is at a comfortable height from the ground for the operator to manually operate the jack lift 130 to raise the container 102 vertically. Four roller jacks 100 are attached to the four corners of the container 102 to lift the container 102 and move it.

Figure 4:
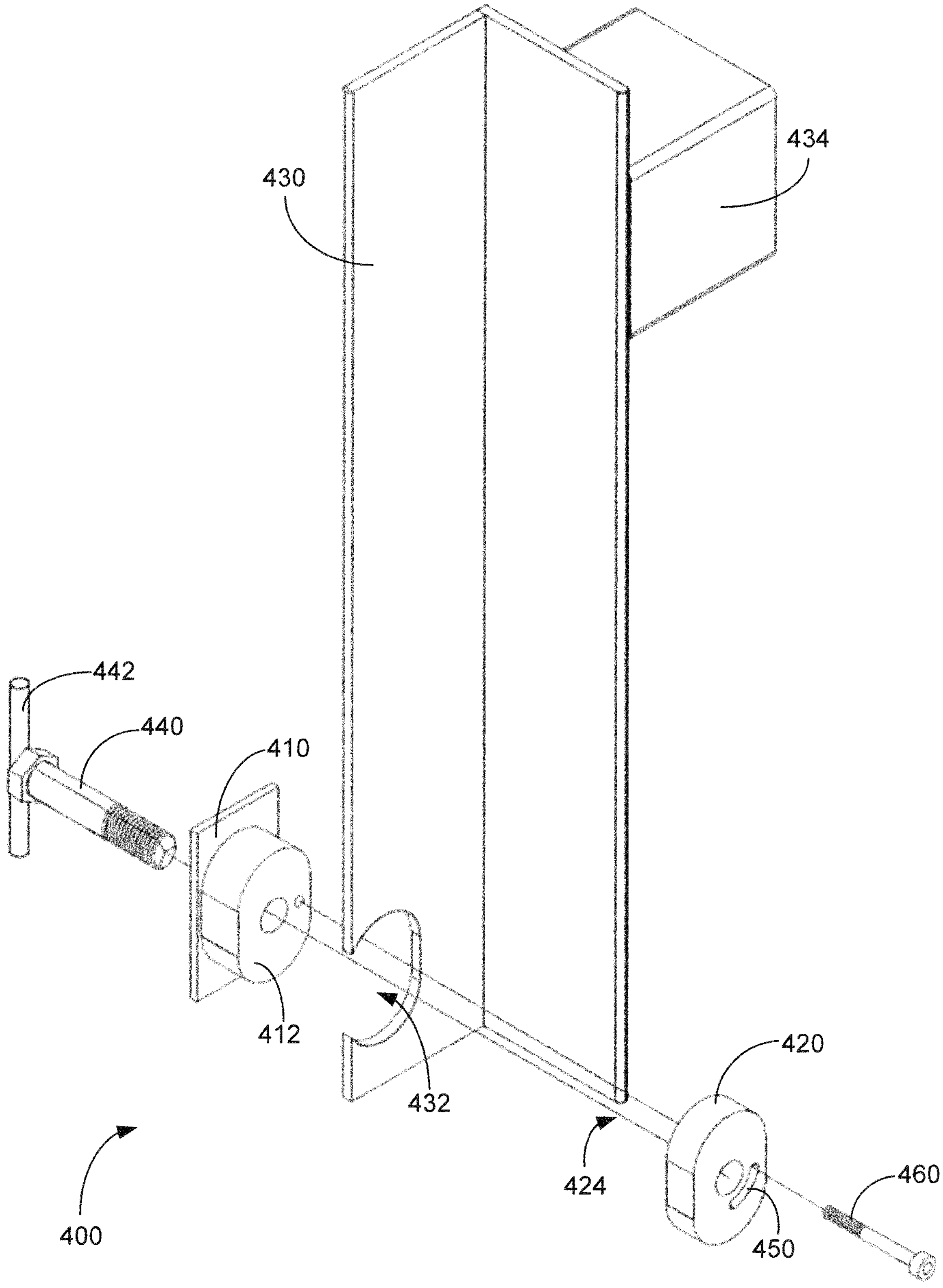
FIG. 4 is an exploded perspective view of a locking mechanism of the roller jack of FIG. 1 for locking the roller jack to the corner block of the container.

FIG. 4 is an exploded perspective view of a locking mechanism of the roller jack of FIG. 1 for releasably locking the roller jack to the corner block of the container. The locking mechanism 400 has a locking mechanism baseplate 410 disposed outside the container wall (such as end wall 204 in FIG. 2) and an elongated (e.g., oval or elliptical) swivel locking plate 420 that is inserted through an elongated angle member opening 432 of the angle member 430 and an elongated (e.g., oval or elliptical) opening of the container corner block into the interior of the container corner block (such as elongated opening 220 of corner block 210 in FIG. 2).

The locking mechanism baseplate 410 is larger than the angle member opening 432 to prevent the locking mechanism baseplate 410 from passing through the angle member opening 432 to an interior of the corner block which is hollow. The locking mechanism baseplate 410 has a baseplate protrusion 412 which is smaller than the angle member opening 432 and the elongated opening of the corner block to allow the baseplate protrusion 412 to pass through the angle member opening 432 and into but not through the elongated opening of the corner block. In the embodiment shown, the baseplate protrusion 412 is an elongated (e.g., oval or elliptical) protrusion that has the same lateral size and oval shape as the elongated swivel locking plate 420. It has a thickness that is at least equal to and may be larger than the thickness of the angle member 430. In specific embodiments, the thickness of the elongated protrusion 412 is equal to or smaller than a combined thickness of the angle member 430 and an external wall (see 510 in FIG. 5) of the container corner block having the elongated opening through which the locking mechanism 400 attaches the angle member 430 to the container corner block. The elongated opening of the container corner block is the same in size as or slightly larger in size than the size of the elongated swivel locking plate 420. The elongated angle member opening 432 is only partial with a cut-out at the edge of the angle member 430. For a wider-angle member 430, the elongated opening will be a complete elongated opening. The angle member 430 is attached (e.g., by welding) to a connecting member 434, in the form of a 4"×4" square tubing, which is in turn attached to the jack lift, which moves the angle member vertically.

The swivel locking plate 420 is smaller than the elongated opening of the external wall of the corner block to allow the swivel locking plate 420 to pass through the angle member opening 432 and the elongated opening of the corner block to the interior of the corner block.

A locking bolt 440 is coupled with the locking mechanism baseplate 410. In the embodiment shown, the locking bolt 440 threadingly connects, from outside the container, the locking mechanism baseplate 410 and the elongated swivel locking plate 420 to rotate the swivel locking plate 420 relative to the locking mechanism baseplate 410 and the corner block around a rotational locking mechanism axis 424 when the swivel locking plate 420 is not rotationally constrained. A handlebar 442 is attached to the locking bolt 440 to form a T-shaped handle. The elongated swivel locking plate 420 has a curved slot 450 which is a quarter of a circle. A stopper 460, in the form of a bolt attached to the locking mechanism baseplate 410, slides along the curved slot 450 of the elongated swivel locking plate 420 and limits the range of rotation of the elongated swivel locking plate 420 to about 90°. The components of the locking mechanism 400 are oriented to rotate around the locking mechanism axis 424 which is a rotational axis oriented in a longitudinal or axial direction of the locking mechanism 400. In the example shown, the locking mechanism axis 424 is parallel to the side wall and the base of the container and perpendicular to the end wall (generally horizontal). The locking mechanism 400 is used to releasably lock the angle member 430 to the corner block of the container through the elongated opening of the external wall of the corner block.

The swivel locking plate 420 is not rotationally constrained when the stopper bolt 460 is free to slide along the curved slot 450 between the two ends of the curved slot 450 during rotation of the swivel locking plate 420 relative to the locking mechanism baseplate 410. When the stopper bolt 460 is disposed at either end of the curved slot 450, the swivel locking plate 420 is rotationally constrained. In that case, turning the locking bolt 440 threadingly moves the swivel locking plate 420 along the locking mechanism axis 424, toward the locking mechanism baseplate 410 by rotating the locking bolt 440 in one direction (e.g., clockwise) and away from the locking mechanism baseplate 410 by rotating the locking bolt 440 in another direction (e.g., counterclockwise).

The stopper bolt 460 has a secondary function of keeping the swivel locking plate 420 from falling off into the interior of the container or the container corner block. Alternatively or additionally, the locking bolt 440 is configured to keep the swivel locking plate 420 from falling off into the interior of the container or the container corner block.

The stopper bolt 460 slidably coupled to the curved slot 450 serves as a rotational constraint which is attached to the locking mechanism baseplate 410 to rotationally constrain the swivel locking plate 420 within a rotational range, for example, of about 45° to about 135°. While a rotational range of about 90° is most typical or effective, a rotational range as low as 45° and as high as 135° can be substantially effective in attaching the angle member 430 to the corner block. In the embodiment shown, the curved slot 450 is a circular curve segment centered around the rotational locking mechanism axis 424 and having a rotational range of 90°.

Figure 5:
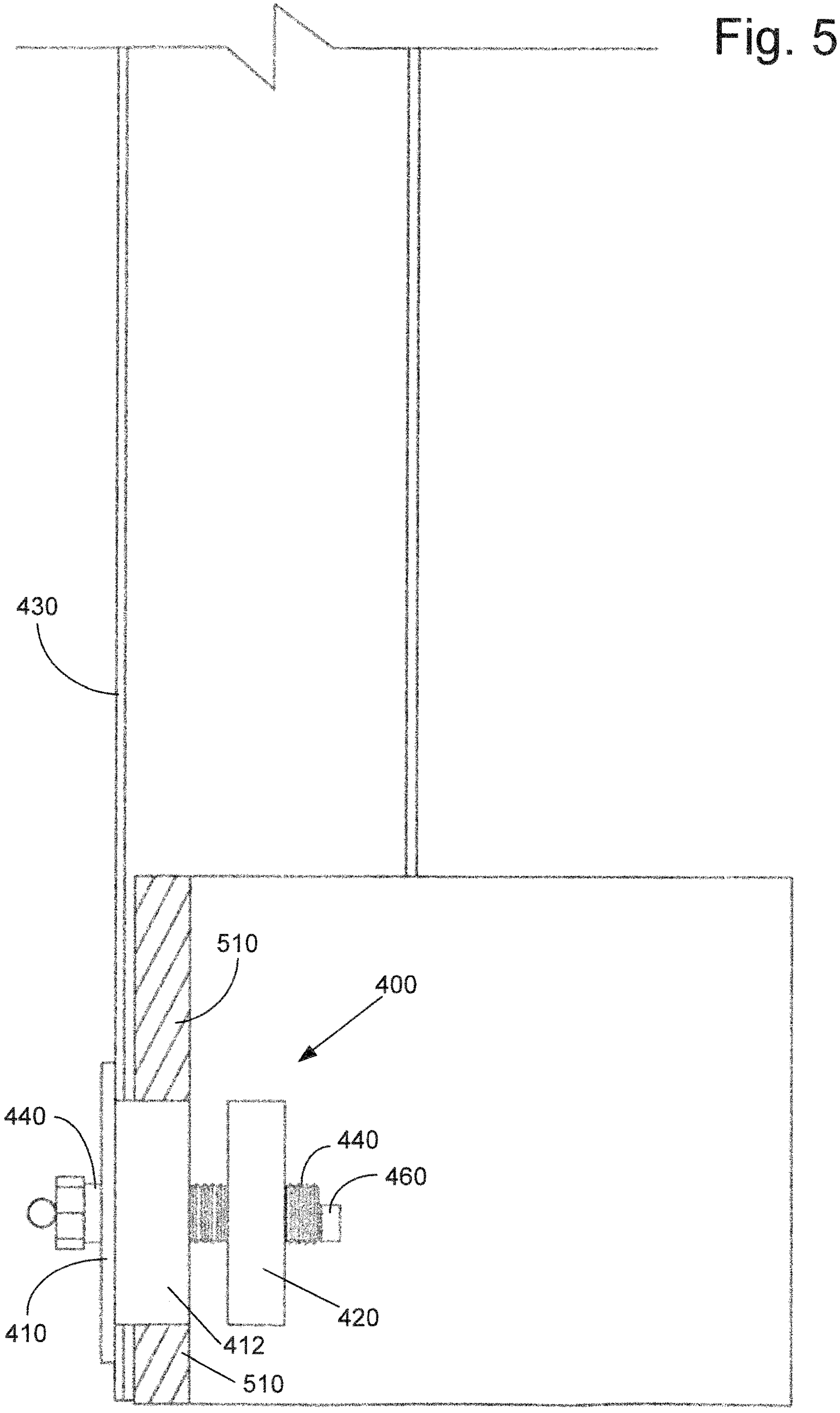
FIG. 5 is an elevational view of the locking mechanism of FIG. 4 having a swivel locking plate inserted into an interior of the corner block of the container.

FIG. 5 is an elevational view of the locking mechanism 400 of FIG. 4 having a swivel locking plate 420 inserted into an interior of the corner block of the container through the external wall 510 of the corner block. Initially, the elongated protrusion 412 of the locking mechanism baseplate 410 is aligned in lateral dimensions with the elongated swivel locking plate 420, which allows them to be inserted into the interior of the corner block from outside the container.

Without any lateral or rotational constraint on the elongated swivel locking plate 420, turning the locking bolt 440 will simply cause the elongated swivel locking plate 420 to turn with the locking bolt 440. With lateral or rotational constraint on the elongated swivel locking plate 420, turning the locking bolt 440 will cause the elongated swivel locking plate 420 to move toward locking mechanism baseplate 410 in one rotational direction (e.g., clockwise) and away from the locking mechanism baseplate 410 in the opposite direction (e.g., counterclockwise).

Figure 6:
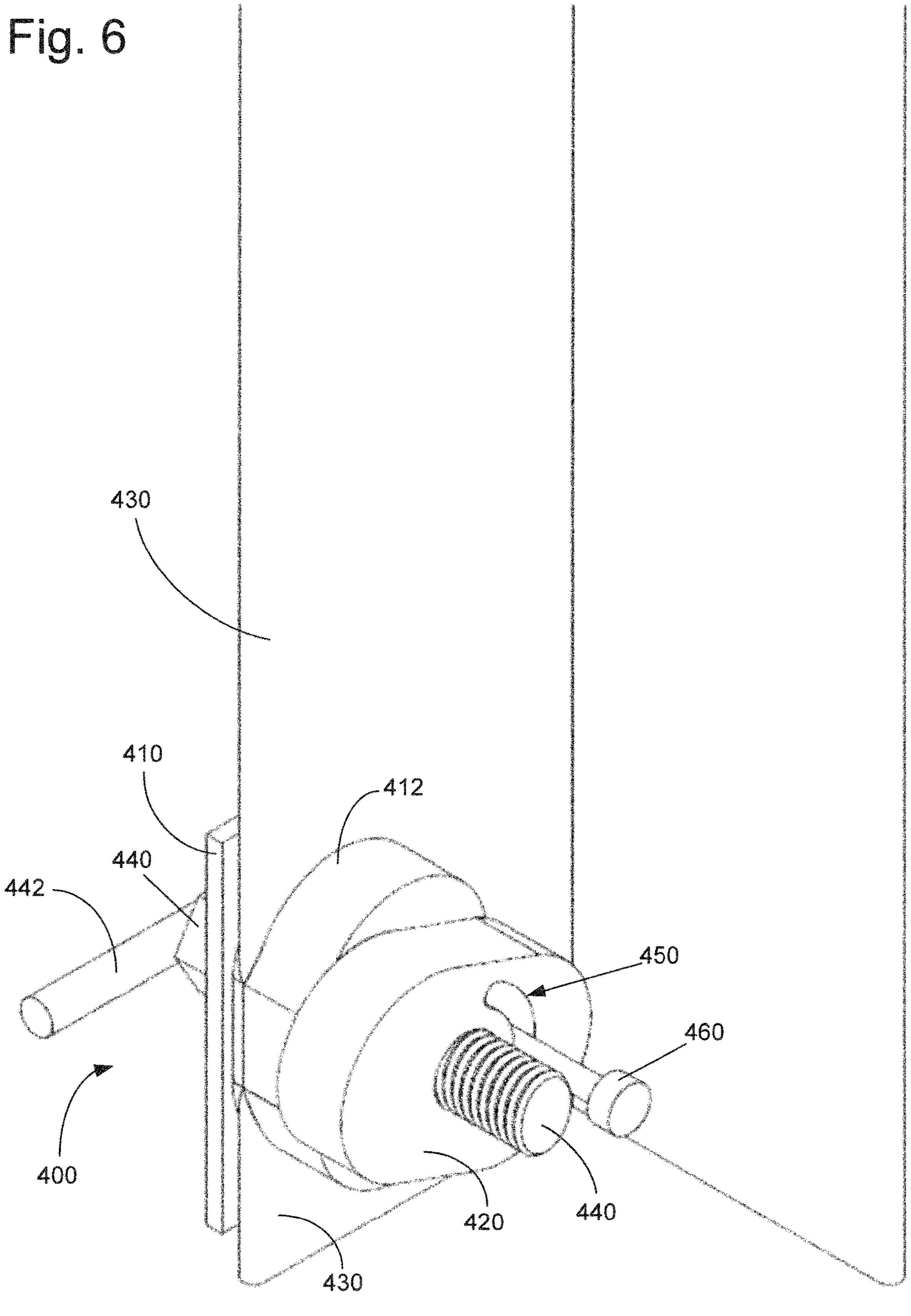
FIG. 6 is a perspective view of the locking mechanism of FIG. 4 illustrating rotation of the swivel locking plate upon insertion into the interior of the corner block of the container.

FIG. 6 is a perspective view of the locking mechanism of FIG. 4 illustrating rotation of the swivel locking plate upon insertion into the interior of the corner block of the container. In this embodiment, the elongated swivel locking plate 420 is rotationally constrained to swivel by about 90° with turning of the locking bolt 440. At that engaged position, the locking mechanism 400 attaches the angle member 430 to the external wall 510 the corner block because the turned elongated swivel locking plate 420 prevents it from exiting the elongated opening of the external wall 510 of the container corner block. In this way, the elongated swivel locking plate 420 is similar to a twist lock (see, e.g., U.S. Pat. No. 6,460,227), but the present locking mechanism 400 goes beyond a conventional twist lock. While FIG. 5 shows the swivel locking plate 420 in the disengaged position, FIG. 6 shows the swivel locking plate 420 in the engaged position.

In the embodiment shown, the swivel locking plate 420 is oval or elliptical and has a major axis length which is a maximum length through the locking mechanism axis 424 and a minor axis length which is a minimum length through the locking mechanism axis. The elongated opening of the external wall 510 of the corner block is also oval or elliptical. The major axis length of the swivel locking plate 420 is smaller than a major axis length of the elongated opening of the corner block and is larger than a minor axis length of the elongated opening of the corner block. In this embodiment, the oval swivel locking plate 420 is about the same in size as or slightly smaller in size than the oval elongated opening of the corner block. Moreover, the elongated protrusion 412 is also oval or elliptical and is about the same in size as the oval or elliptical swivel locking plate 420. Furthermore, the angle member opening 432 is also oval or elliptical in shape and is about the same in size as the elongated opening of the corner block.

In other embodiments, the swivel locking plate 420 and the elongated opening of the external wall 510 of the corner block need not be oval or elliptical. For example, they may have the shape of a cross with rounded corners or edges, such that the swivel locking plate 420 has a major length which is a maximum length of the swivel locking plate 420 through the locking mechanism axis 424 and is larger than a minor length which is a minimum length of the swivel locking plate 420 through the locking mechanism axis 424. The major length and the minor length may be perpendicular with respect to one another. The major length of the swivel locking plate 420 is smaller than a major length of the elongated opening (e.g., cross shaped) of the corner block which is a maximum length of the elongated opening through the locking mechanism axis 424 and is larger than a minor length of the elongated opening of the corner block which is a minimum length of the elongated opening through the locking mechanism axis 424. In this example, the elongated protrusion 412 and the angle member opening 432 may also be cross shaped and be about the same in size as the elongate opening of the corner block and swivel locking plate 420, respectively.

In other embodiments, the angle member opening 432 matches in vertical dimension to the elongated opening of the external wall 510 of the corner block. This ensures an effective transfer of vertical lift forces from the roller jack 100 to the corner block of the container. The angle member opening 432 need not match in shape to the elongated opening of the corner block or the elongated protrusion 432 or the swivel locking plate 420. For example, the angle member opening 432 may be circular having a diameter that is equal to major length of the elongated opening of the corner block and slight larger than the major length of the swivel locking plate 420 and the major length of the elongated protrusion 432.

Figure 7:
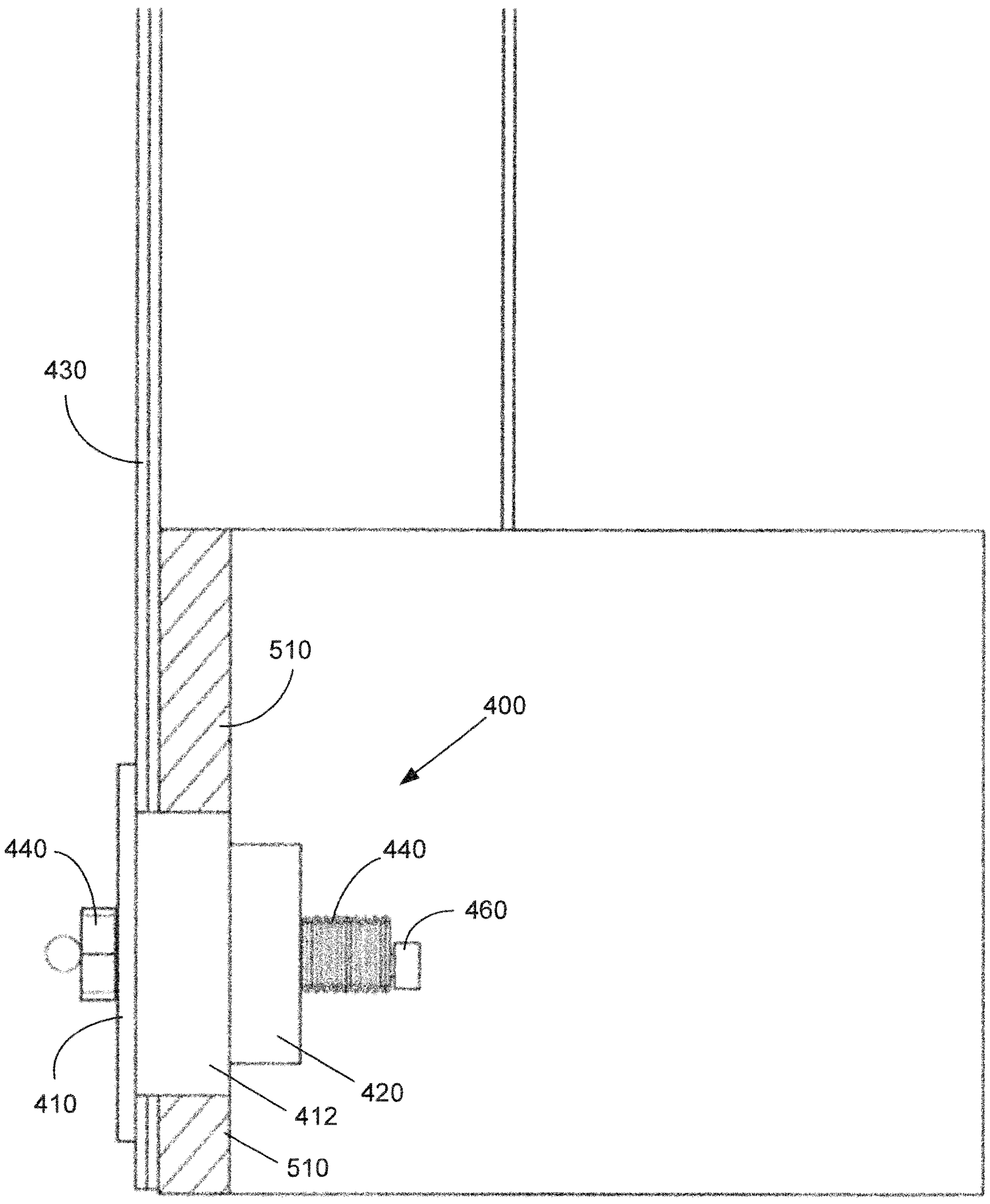
FIG. 7 is an elevational view of the locking mechanism of FIG. 6 illustrating the use of the swivel locking plate inserted into the interior of the corner block to lock the roller jack to the corner block.

FIG. 7 is an elevational view of the locking mechanism of FIG. 6 illustrating the use of the swivel locking plate inserted into the interior of the corner block to lock the roller jack to the external wall 510 of the corner block. The elongated swivel locking plate 420 has the curved slot 450 which is a quarter of a circle. The stopper bolt 460 attached to the locking mechanism baseplate 410 slides along the curved slot 450 of the elongated swivel locking plate 420 and, after the elongated swivel locking plate 420 has been turned by 90° (typically in the clockwise direction), prevents the elongated swivel locking plate 420 from turning any further. Once in the stopped position, further turning of the locking bolt 440 causes the elongated swivel locking plate 420, via the threaded connection between them, to move toward the locking mechanism baseplate 410 press the external wall 510 of the container corner block against the locking mechanism baseplate 410, thereby securely locking the angle member 430 to the external wall 510 of the container corner block. Likewise, turning the locking bolt 440 in the opposite direction (i.e., counterclockwise) will cause the elongated swivel locking plate 420 to rotate by 90° which is stopped from further rotating by the stopper bolt 460 at the opposite end of the curved slot 450. At that disengaged position, the elongated protrusion 412 of the locking mechanism baseplate 410 is again aligned in lateral dimensions with the elongated swivel locking plate 420, allowing the locking mechanism 400 to be disconnected from the container block corner.

The locking mechanism 400 is used to move the swivel locking plate 420 between the disengaged position, where the swivel locking plate 420 is allowed to pass through the angle member opening 432 and the elongated opening of the external wall 510 of the corner block along the locking mechanism axis 424, and the engaged position, where the swivel locking plate 420 is prevented from passing through the angle member opening 432 and the elongated opening of the external wall 510 of the corner block along the locking mechanism axis 424. Furthermore, the locking mechanism 400 is used to lock the angle member 430 to the corner block in the engaged position by moving the swivel locking plate 420 from the engaged position toward the locking mechanism baseplate 410 along the locking mechanism axis 424 to press the angle member 430 and the external wall 510 of the corner block having the elongated opening together between the locking mechanism baseplate 410 and the swivel locking plate 420 in a locked position, and to unlock the angle member 430 from the corner block by moving the swivel locking plate 420 from the locked position away from the locking mechanism baseplate 410 along the locking mechanism axis 424, back to the engaged position.

A conventional twist lock only prevents the locked item from being pulled out of an elongated opening in a longitudinal or axial direction that is perpendicular to the plane of the elongated opening. In contrast, the locking mechanism 400 of FIG. 4 further prevents lateral movements between the angle member 430 and the container corner block in lateral directions perpendicular to the longitudinal direction of the elongated opening by pressing them together in the longitudinal direction. In sum, FIG. 5 shows the swivel locking plate 420 in the disengaged position, FIG. 6 shows the swivel locking plate 420 in the engaged position, and FIG. 7 shows the swivel locking plate 420 in the locked position. A conventional twist lock has the first two positions (disengaged and engaged) but not the third position (locked).

Figure 8:
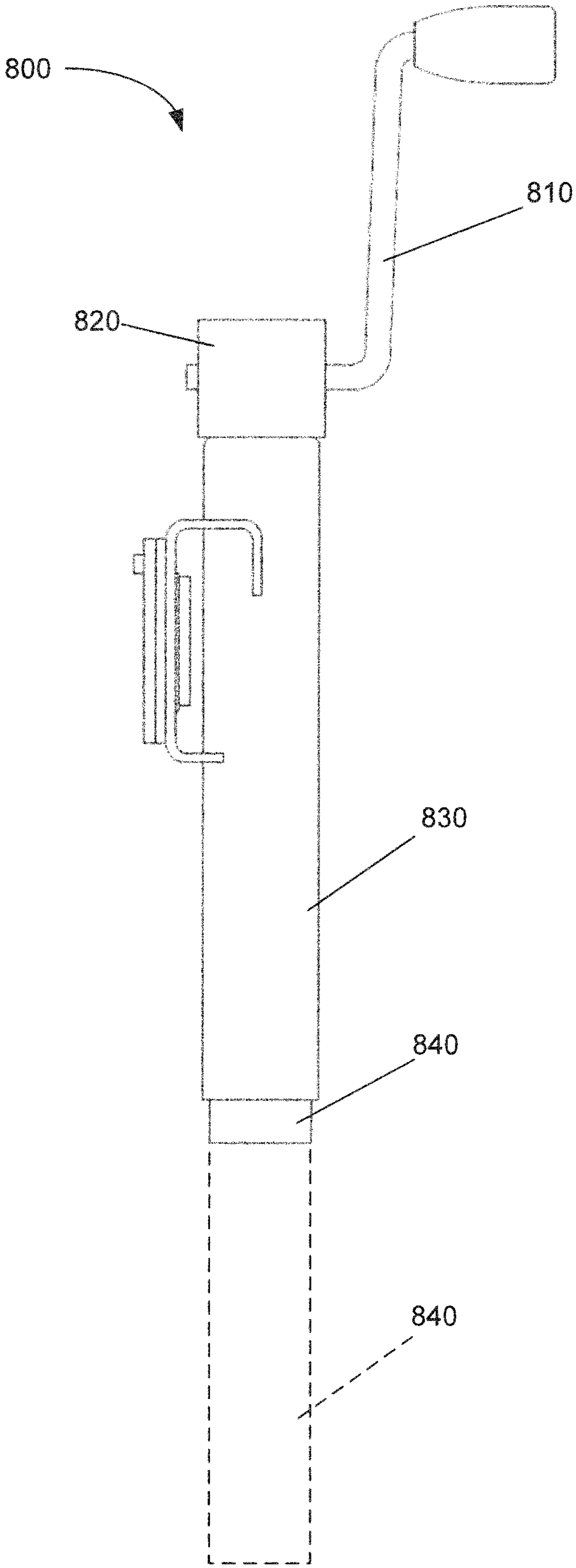
FIG. 8 is an elevational view of a jack lift of the roller jack of FIG. 1.

FIG. 8 is an elevational view of a jack lift of the roller jack of FIG. 1. The jack lift 800 includes a crank arm 810, a gear box 820, and an outer tube 830 and an inner tube 840 in a telescoping configuration along a generally vertical direction. The inner tube 840 is slidable relative to the outer tube 830 in a telescoping manner between an unextended position and an extended position. The jack lift 800 has a vertical lift between a minimum height position and a maximum height position. FIG. 8 shows a maximum lift in dashed lines between the extended and unextended positions. For lifting a container, the maximum lift may range from a few inches (e.g., about 3 inches) to about 10 inches or more.

Figure 9:
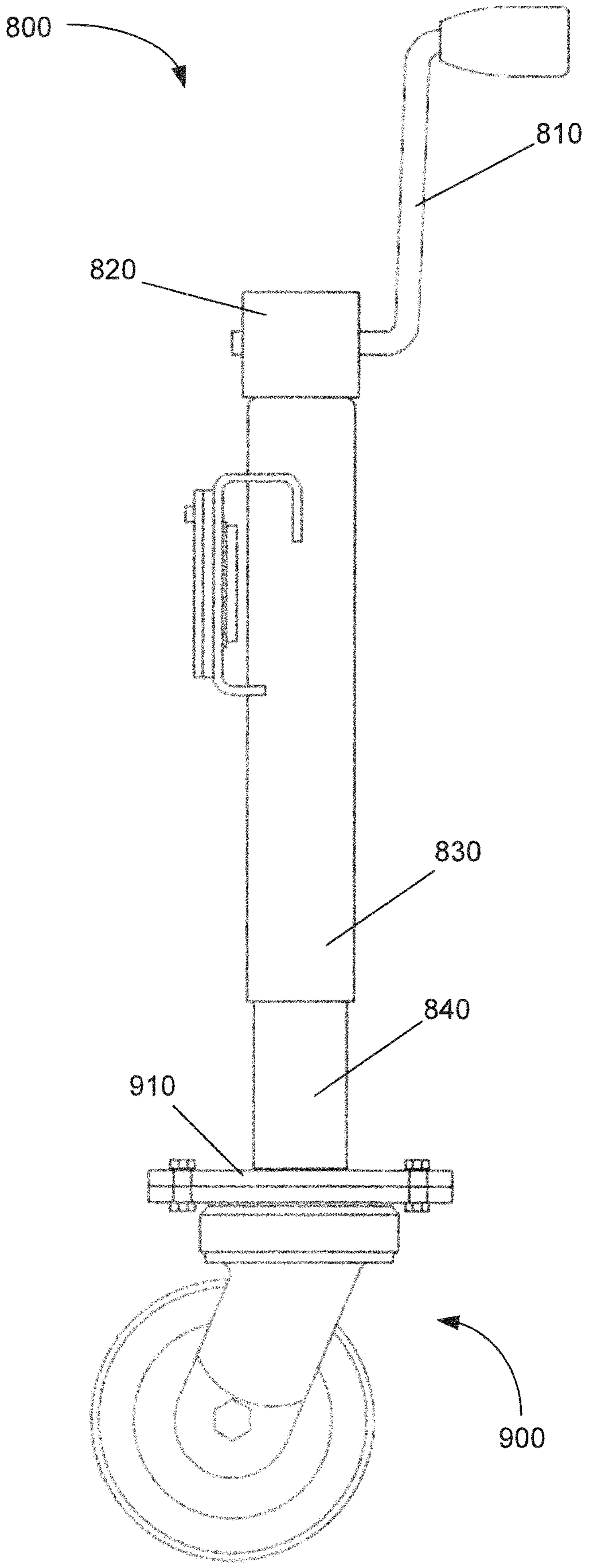
FIG. 9 is an elevational view of a connection between the jack lift of FIG. 8 and a caster wheel.

FIG. 9 is an elevational view of a connection between the jack lift of FIG. 8 and a caster wheel. The inner tube 840 of the jack lift 800 is attached at the bottom via an attachment plate 910 to a caster wheel 900. For example, the inner tube 840 is welded to the attachment plate 910, which is bolted to the caster wheel 900.

Figure 10:
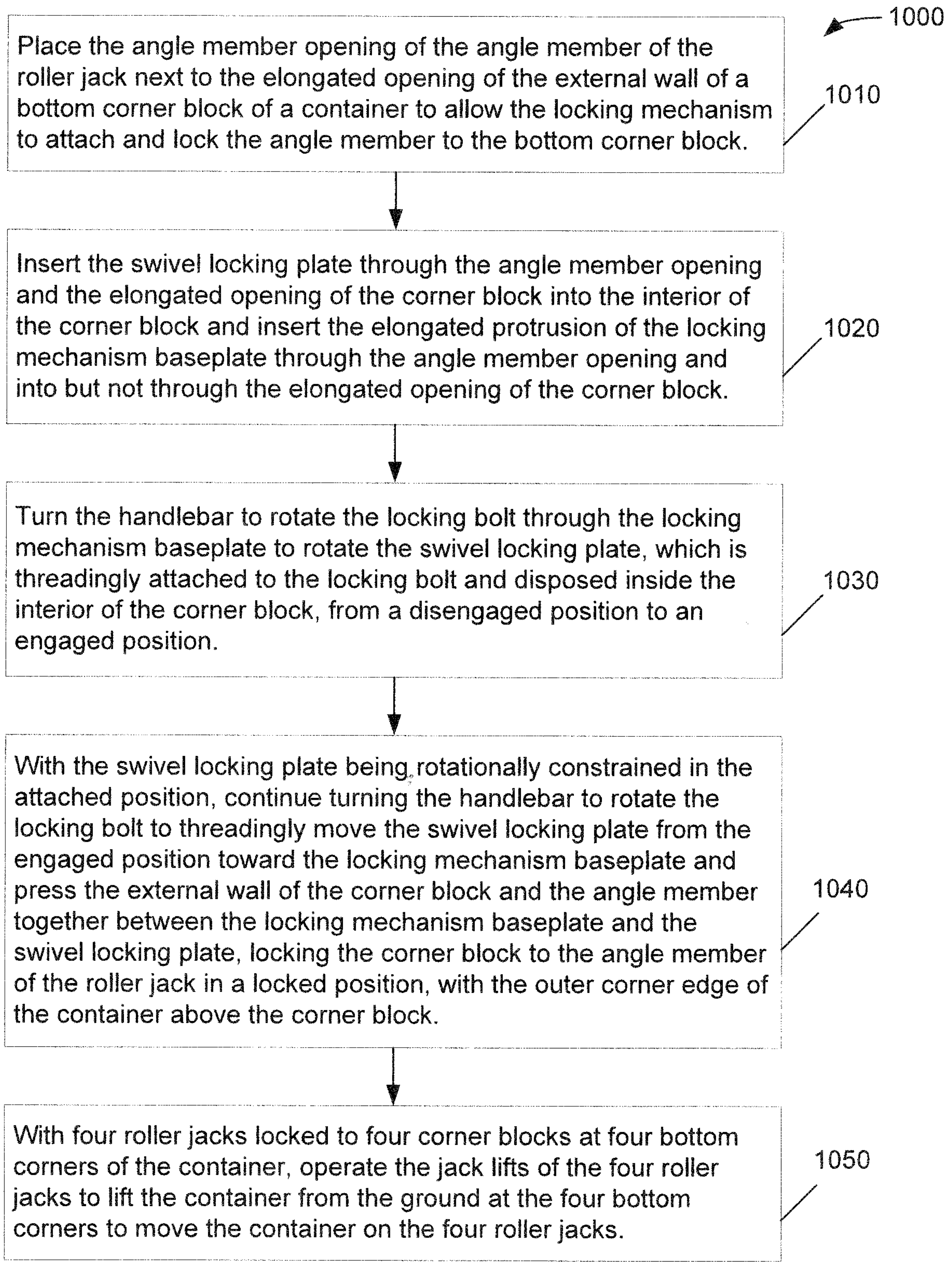
FIG. 10 is a flow diagram illustrating a process of attaching the roller jack to the corner block of a container and lifting the container for rolling movement.

FIG. 10 is a flow diagram 1000 illustrating a process of attaching the roller jack to the lower corner block of a container and lifting the container for rolling movement. The jack lift is at the minimum height with the inner tube at the unextended position. The roller jack 100 is moved to place the elongated angle member opening 432 of the angle member 430 next to the elongated opening 510 of a corner block of the container and place the two elongated openings in alignment with one another along the locking mechanism axis 424, with the angle member 430 substantially wrapped around the outer corner edge of the container (step 1010). The locking mechanism 400 is used to attach the angle member to the corner block by inserting the elongated protrusion 412 of the locking mechanism baseplate 410 through the elongated opening of the angle member 430 and into but not through the elongated opening of the corner block, inserting the elongated swivel locking plate 420 through the two aligned elongated openings into the interior of the corner block (step 1020), and turning the handle bar 420 attached to the locking bolt 440 by 90° around the locking mechanism axis, moving the swivel locking plate inside the interior of the corner block from the disengaged position (where the swivel locking plate is allowed to pass through the angle member opening and the elongated opening of the corner block along the locking mechanism axis) to the engaged position (where the swivel locking plate is prevented from passing through the angle member opening and the elongated opening of the corner block along the locking mechanism axis) (step 1030). With swivel locking plate 420 being rotationally constrained in the engaged position, further turning of the handle bar 420 threadingly moves the elongated swivel locking plate 420 toward the locking mechanism baseplate 410 along the locking mechanism axis, pressing the external wall of the corner block against the angle member in a locked position, thereby locking the roller jack 100 to the corner of the container, with the angle member wrapped around the outer corner edge of the container above the corner block (step 1040). When all four roller jacks are engaged and locked to four lower corners of the container, the jack lift 800 of each roller jack is used to lift the container at the corresponding corner from the ground by turning the crank arm 810 to move the telescoping inner tube 840 and outer tube 830 from the unextended position toward the extended position by the desired amount of lift (step 1050). The roller jacks can then be used to move the lifted container to a desired location.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A roller jack apparatus comprising:

a caster wheel;

a jack lift attached to the caster wheel, the jack lift having a vertical lift between a minimum height position and a maximum height position;

a jack stand having an angle member which is attached to the jack lift to be moved vertically by the jack lift and includes an angle member opening which is elongated; and a locking mechanism to releasably lock the angle member to a corner block of a container through an elongated opening of an external wall of the corner block, the locking mechanism including a locking mechanism baseplate which is larger than the angle member opening to prevent the locking mechanism baseplate from passing through the angle member opening to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block;

a swivel locking plate which is smaller than the elongated opening of the corner block to allow the swivel locking plate to pass through the angle member opening and the elongated opening of the corner block to the interior of the corner block;

a locking bolt coupled with the locking mechanism baseplate and threadingly connected to the swivel locking plate to rotate the swivel locking plate relative to the locking mechanism baseplate and the corner block around a rotational axis when the swivel locking plate is not rotationally constrained, and to threadingly move the swivel locking plate along the rotational axis, when the swivel locking plate is rotationally constrained, toward the locking mechanism baseplate by rotating the locking bolt in one direction and away from the locking mechanism baseplate by rotating the locking bolt in another direction, the swivel locking plate having a major length which is a maximum length of the swivel locking plate through the rotational axis and larger than a minor length which is a minimum length of the swivel locking plate through the rotational axis, the major length of the swivel locking plate being smaller than a major length of the elongated opening of the corner block which is a maximum length of the elongated opening through the rotational axis and being larger than a minor length of the elongated opening of the corner block which is a minimum length of the elongated opening through the rotational axis; and a rotational constraint attached to the locking mechanism baseplate to rotationally constrain the swivel locking plate within a rotational range of about 45° to about 135°.

2. The roller jack apparatus of claim 1, wherein the elongated opening of the corner block is oval.

3. The roller jack apparatus of claim 1, wherein the swivel locking plate is oval.

4. The roller jack apparatus of claim 1, wherein the angle member opening matches in vertical dimension to the elongated opening of the corner block.

5. The roller jack apparatus of claim 4, wherein the elongated protrusion has a thickness not greater than a combined thickness of the angle member and the external wall of the corner block having the elongated opening.

6. The roller jack apparatus of claim 1, wherein the angle member is wrapped around an outer corner edge of the container above the corner block when the locking mechanism locks the angle member to the corner block through the elongated opening of the corner block.

7. The roller jack apparatus of claim 1, wherein the rotational constraint comprises a stopper bolt attached to the locking mechanism baseplate; and wherein the swivel locking plate includes a curved slot along which the stopper bolt slide when the swivel locking plate is rotated relative to the locking mechanism baseplate by rotating the locking bolt.

8. The roller jack apparatus of claim 7, wherein the curved slot is a circular slot centered around the rotational axis and having a rotational range of 90°.

9. A roller jack apparatus comprising:

a caster wheel;

a jack lift attached to the caster wheel, the jack lift having a vertical lift between a minimum height position and a maximum height position;

a jack stand having an angle member which is attached to the jack lift to be moved vertically by the jack lift and includes an angle member opening which is elongated; and a locking mechanism to releasably lock the angle member to a corner block of a container through an elongated opening of an external wall of the corner block, the locking mechanism including a locking mechanism baseplate which is larger than the angle member opening to prevent the locking mechanism baseplate from passing through the angle member opening to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block;

a swivel locking plate which is smaller than the elongated opening of the corner block to allow the swivel locking plate to pass through the angle member opening and the elongated opening of the corner block to the interior of the corner block;

means for moving the swivel locking plate between a disengaged position, where the swivel locking plate is allowed to pass through the angle member opening and the elongated opening of the corner block along a locking mechanism axis, and an engaged position, where the swivel locking plate is prevented from passing through the angle member opening and the elongated opening of the corner block along the locking mechanism axis; and means for locking the angle member to the corner block in the engaged position by moving the swivel locking plate from the engaged position toward the locking mechanism baseplate along the locking mechanism axis to press the angle member and the external wall of the corner block having the elongated opening together between the locking mechanism baseplate and the swivel locking plate in a locked position.

10. The roller jack apparatus of claim 9, wherein the swivel locking plate has a major length which is a maximum length of the swivel locking plate through the locking mechanism axis and larger than a minor length which is a minimum length of the swivel locking plate through the locking mechanism axis; and wherein the major length of the swivel locking plate is smaller than a major length of the elongated opening of the corner block which is a maximum length of the elongated opening through the locking mechanism axis and the major length of the swivel locking plate is larger than a minor length of the elongated opening of the corner block which is a minimum length of the elongated opening through the locking mechanism axis.

11. The roller jack apparatus of claim 9, wherein the means for locking the angle member to the corner block in the engaged position comprises means for unlocking the angle member from the corner block by moving the swivel locking plate from the locked position away from the locking mechanism baseplate along the locking mechanism axis to the engaged position.

12. The roller jack apparatus of claim 9, wherein the angle member is wrapped around an outer corner edge of the container above the corner block when the means for locking locks the angle member to the corner block through the elongated opening of the corner block in the locked position.

13. The roller jack apparatus of claim 9, wherein the elongated opening of the corner block is oval; and wherein the swivel locking plate is oval.

14. The roller jack apparatus of claim 9, wherein the elongated opening of the corner block is oval; and wherein the angle member opening matches in vertical dimension to the elongated opening of the corner block.

15. The roller jack apparatus of claim 9, wherein, the elongated protrusion has a thickness not greater than a combined thickness of the angle member and the external wall of the corner block having the elongated opening.

16. A method of lifting a container at a lower corner there using a roller jack apparatus which includes a caster wheel, a jack lift attached to the caster wheel and having a vertical lift between a minimum height position and a maximum height position, a jack stand having an angle member which is attached to the jack lift to be moved vertically by the jack lift and includes an angle member opening which is elongated, and a locking mechanism to releasably lock the angle member to a corner block of the container through an elongated opening of an external wall of the corner block, the locking mechanism including a locking mechanism baseplate and a swivel locking plate; the locking mechanism baseplate being larger than the angle member opening to prevent the locking mechanism baseplate from passing through the angle member opening along a locking mechanism axis to an interior of the corner block which is hollow, the locking mechanism baseplate having a baseplate protrusion which is smaller than the angle member opening and the elongated opening of the corner block to allow the baseplate protrusion to pass through the angle member opening and into but not through the elongated opening of the corner block; the swivel locking plate being smaller than the elongated opening of the corner block to allow the swivel locking plate to pass through the angle member opening and the elongated opening of the corner block to the interior of the corner block; the method comprising:

placing the angle member opening of the angle member next to the elongated opening of the corner block of the container, in alignment with one another along the locking mechanism axis;

inserting the elongated swivel locking plate through the angle member opening and the elongated opening of the corner block into the interior of the corner block in a disengaged position;

inserting the elongated protrusion of the locking mechanism baseplate through the angle member opening and into but not through the elongated opening of the corner block;

moving the swivel locking plate inside the interior of the corner block from the disengaged position, where the swivel locking plate is allowed to pass through the angle member opening and the elongated opening of the corner block along the locking mechanism axis, to an engaged position, where the swivel locking plate is prevented from passing through the angle member opening and the elongated opening of the corner block along the locking mechanism axis;

locking the angle member to the corner block in the engaged position by moving the swivel locking plate from the engaged position toward the locking mechanism baseplate in the locking mechanism direction to press the angle member and the external wall of the corner block having the elongated opening together between the locking mechanism baseplate and the swivel locking plate in a locked position; and moving the jack lift upward to lift the angle member attached to the jack lift and the corner block engaged and locked to the angle member.

17. The method of claim 16, further comprising:

wrapping the angle member around an outer corner edge of the container above the corner block when the angle member is locked to the corner block through the elongated opening of the corner block.

18. The method of claim 16, further comprising:

unlocking the angle member from the corner block by moving the swivel locking plate from the locked position away from the locking mechanism baseplate in the locking mechanism direction to the engaged position.

19. The method of claim 16, wherein the locking mechanism further includes a locking bolt coupled with the locking mechanism baseplate and threadingly connected to the swivel locking plate to rotate the swivel locking plate relative to the locking mechanism baseplate and the corner block around the locking mechanism axis when the swivel locking plate is not rotationally constrained;

wherein the roller jack apparatus further includes a rotational constraint having a stopper bolt attached to the locking mechanism baseplate;

wherein the swivel locking plate includes a curved slot along which the stopper bolt slide when the swivel locking plate is rotated relative to the locking mechanism baseplate by rotating the locking bolt; and wherein moving the swivel locking plate inside the interior of the corner block from the disengaged position to the engaged position comprises rotating the locking bolt to rotate the swivel locking plate from the disengaged position to the engaged position when the swivel locking plate rotates with the stopper bolt sliding along the curved slot of the swivel locking plate without being rotationally constrained.

20. The method of claim 19, wherein the locking bolt is threadingly connected to the swivel locking plate to threadingly move the swivel locking plate along the rotational axis, when the swivel locking plate is rotationally constrained, toward the locking mechanism baseplate by rotating the locking bolt in one direction and away from the locking mechanism baseplate by rotating the locking bolt in another direction; and wherein locking the angle member to the corner block in the engaged position comprises rotating the locking bolt when the stopper bolt is stopped against an end of the curved slot of the swivel locking plate to rotationally constrain the swivel locking plate, thereby moving the swivel locking plate from the engaged position toward the locking mechanism baseplate in the locking mechanism direction to press the angle member and the external wall of the corner block having the elongated opening together between the locking mechanism baseplate and the swivel locking plate in the locked position.

* * * * *